United States Patent
Farkash et al.

(10) Patent No.: US 10,360,402 B2
(45) Date of Patent: Jul. 23, 2019

(54) INTERCEPTING SENSITIVE DATA USING HASHED CANDIDATES

(71) Applicant: International Business Machines Corporation, Armonk, NY (US)

(72) Inventors: Ariel Farkash, Shimshit (IL); Ayman Jarrous, Shafa-amer (IL); Micha Moffie, Zichron Yaakov (IL); Gal Peretz, Ramat-Yishai (IL); Tamer Salman, Haifa (IL)

(73) Assignee: International Business Machines Corporation, Armonk, NY (US)

(*) Notice: Subject to any disclaimer, the term of this patent is extended or adjusted under 35 U.S.C. 154(b) by 224 days.

(21) Appl. No.: 15/351,454

(22) Filed: Nov. 15, 2016

(65) Prior Publication Data

US 2018/0137303 A1     May 17, 2018

(51) Int. Cl.
| | |
|---|---|
| *H04L 9/08* | (2006.01) |
| *G06F 21/62* | (2013.01) |
| *H04L 9/06* | (2006.01) |
| *H04L 9/32* | (2006.01) |
| *H04L 29/06* | (2006.01) |

(52) U.S. Cl.
CPC ...... *G06F 21/6245* (2013.01); *G06F 21/6263* (2013.01); *H04L 9/0643* (2013.01); *H04L 9/0894* (2013.01); *H04L 9/3247* (2013.01); *H04L 63/083* (2013.01); *G06F 2221/031* (2013.01)

(58) Field of Classification Search
CPC ............ G06F 21/6245; G06F 21/6263; G06F 2221/031; H04L 63/083; H04L 9/0643; H04L 9/3247
See application file for complete search history.

(56) References Cited

U.S. PATENT DOCUMENTS 9,021,389 B1 * 4/2015 Torney ................ G06F 21/6218
715/808
9,311,495 B2 * 4/2016 Readshaw ............... G06F 21/55
(Continued)

FOREIGN PATENT DOCUMENTS

WO     2016010665     1/2016

OTHER PUBLICATIONS

Rosiello et al.; "A Layout-Similarity-Based Approach for Detecting Phishing Pages"; 2007, 10 pages. URL: https://www.cs.ucsb.edu/~chris/research/doc/securecomm07_antiphishdom.pdf.
(Continued)

*Primary Examiner* — Khoi V Le

(74) *Attorney, Agent, or Firm* — Barry Blount

(57) ABSTRACT

An example system includes a processor to receive hashed sensitive data including attributes, a hashing function, and text classifiers. The processor is to also monitor a user interface and detect an input text or an output text. The processor is to further scan the detected input text or the detected output text to detect a candidate based on the text classifiers. The processor is also to hash the detected candidate using the hashing function to generate a hashed candidate. The processor is to match the hashed candidate with hashed sensitive data. The processor is to also further extract an attribute from the matched hashed sensitive data. The processor is to intercept the output text based at least on the extracted attribute.

19 Claims, 7 Drawing Sheets

(56) References Cited

U.S. PATENT DOCUMENTS

2015/0242639 A1* 8/2015 Galil .................. G06F 21/552
                                                            726/1
2016/0127399 A1* 5/2016 Starink ................ G06F 16/22
                                                            726/23

OTHER PUBLICATIONS

Oinam Bhopen Singh and Dr. Hitesh Tahbildar; "A Literature Survey on Anti-Phishing Browser Extensions"; Aug. 2015, 17 pages. URL: http://airccse.org/journal/ijcses/papers/6415ijcses02.pdf.

* cited by examiner

INTERCEPTING SENSITIVE DATA USING HASHED CANDIDATES

BACKGROUND

The present techniques relate to intercepting sensitive data. More specifically, the techniques relate to intercepting sensitive data using hashed candidates.

SUMMARY

According to an embodiment described herein, a system can include a processor to receive hashed sensitive data, a hashing function, and text classifiers, wherein the hashed sensitive data comprises a plurality of attributes. The processor can also further monitor a user interface and detect an input text or an output text. The processor can also scan the detected input text or the detected output text to detect a candidate based on the text classifiers. The processor can also further hash the detected candidate using the hashing function to generate a hashed candidate. The processor can also match the hashed candidate with hashed sensitive data. The processor can further extract at least one of the plurality of attributes from the matched hashed sensitive data. The processor can also further intercept the output text based at least on the extracted attribute.

According to another embodiment described herein, a computer-implemented method can include receiving, via a processor, hashed sensitive data comprising attributes, a hashing function, and text classifiers. The method can also further include monitoring, via the processor, a user interface and detect an input text or an output text. The method can also include scanning, via the processor, the detected input text or the detected output text to identify a candidate based on the text classifiers. The method can also include hashing, via the processor, the detected candidate using the hashing function to generate a hashed candidate. The method can further include matching, via the processor, the hashed candidate with hashed sensitive data. The method can also further include extracting, via the processor, an attribute from the matched hashed sensitive data. The method can further include intercepting, via the processor, the output text based at least on the extracted attribute.

According to another embodiment described herein, a computer program product for can include computer-readable storage medium having program code embodied therewith. The computer readable storage medium is not a transitory signal per se. The program code is executable by a processor to cause the processor to receive hashed sensitive data, a hashing function, and text classifiers, wherein the hashed sensitive data comprises an attribute. The program code can also cause the processor to monitor a user interface and detect an input text or an output text. The program code can also cause the processor to scan the detected input text or the detected output text to detect a candidate based on the text classifiers. The program code can also cause the processor to hash the detected candidate using the hashing function to generate a hashed candidate. The program code can also cause the processor to also further match the hashed candidate with hashed sensitive data. The program code can also cause the processor to extract the attribute from the matched hashed sensitive data. The program code can also cause the processor to also further intercept the output text based at least on the extracted attribute. The program code can also cause the processor to generate an alert or report based at least on the extracted attribute.

DETAILED DESCRIPTION

Figure 1:
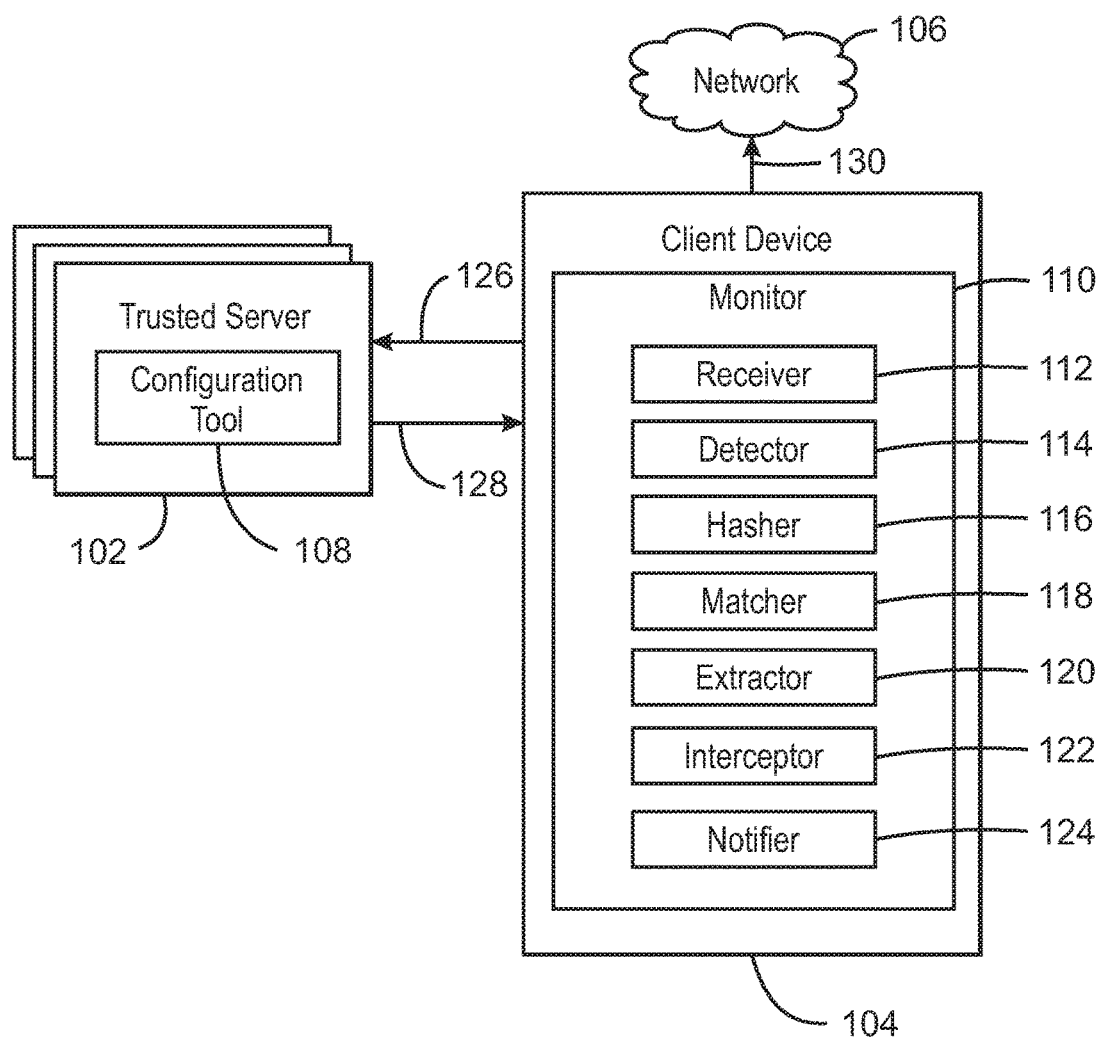
FIG. 1 is a block diagram of an example system that can intercept sensitive data using hashed candidates.

Phishing and other email scams are increasingly common methods that attackers use to obtain sensitive information from users. Some common types of sensitive information attackers may seek include personal data, credit card credentials, domain names and hosting credentials. One of the more prevalent scams, known as Business Email Compromise, involves a phisher tricking the user to transfer funds to an account belonging to the phisher. Some academic works propose to prevent data leakage via generic frameworks that track data at very low levels of abstraction. However, it may be difficult to identify the semantics of information that should be protected at a byte level. It may also be difficult to distinguish the specific information to be protected as the source of all information may be the user. For example, the user may type in the information to be protected in such solutions. In addition, users may not always be aware of sensitive data or inadvertently disclose it regardless of their knowledge. As used herein, sensitive data may include any valuable data, including personal information, classified information, and trade secrets, among other possible valuable data.

According to embodiments of the present techniques a processor may receive hashed sensitive data, a hashing function, and text classifiers. For example, the hashed sensitive data may include one or more attributes. The processor may monitor a user interface and detect an input text or an output text. For example, the user interface may be a web browser or an email application. The processor may also scan the detected input text or the detected output text to detect a candidate based on the text classifiers. The processor may further hash the detected candidate using the hashing function to generate a hashed candidate. The processor may then match the hashed candidate with hashed sensitive data. The processor may then extract an attribute from the matched hashed sensitive data. The processor may then intercept the output text based at least on the extracted attribute. Thus, the present techniques can detect and prevent the accidental, unintended, or maliciously induced release of valuable data to unauthorized parties. The present techniques may be able to precisely monitor data that a user fills in web sites and pages. For example, a browser plugin may enable the system to detect high level semantics of the user actions, such as input text, sending or posting events, as well as a target uniform resource locator (URL). In the case that the user provides sensitive data to suspect web sites, the present techniques may block the data transmission and alert the user. Thus, the techniques may enable both phishing attacks to be stopped and prevent inadvertent disclosures of sensitive data. Moreover, the present techniques have a minimal impact on performance and no impact on users' privacy or security. For example, hashed sensitive information provided by the trusted server will not impact users' privacy or security even if it becomes public because hashed data is not reversible. In addition, the present techniques enable new phishing techniques to be stopped before they are discovered. Furthermore, the techniques here can protect from a combined attack using a malware (or a malicious insider) and a phishing attempt by validating a received configuration file.

In some scenarios, the techniques described herein may be implemented in a cloud computing environment. As discussed in more detail below in reference to at least FIGS. 4, 5, and 6, a computing device configured to intercept sensitive data using hashed candidates may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can intercept sensitive data using hashed candidates. The system is generally referred to using the reference number 100 and can be implemented at least in part using the computing device 400 of FIG. 4 below.

The example system 100 includes one or more trusted servers 102 and a client device 104 that is communicatively coupled to a network 106. For example, the network 106 may be the Internet. The trusted servers 102 include a configuration tool 108. The client device 104 includes a monitor 110. The monitor 110 may include logic for intercepting sensitive data using hashed candidates. For example, the monitor 110 can be a browser plugin, email application plugin, a proxy, or any other suitable monitoring module. The monitor 110 may include a receiver 112, a classifier 114, a hasher 116, a matcher 118, an extractor 120, an interceptor 122, and a notifier 124. The trusted servers 102 are communicatively coupled to the client device 104 as indicated by arrows 126, 128.

In the example system 100, the configuration tool 108 of trusted servers 102 may be used to identify sensitive data to be protected, a set of attributes that may be relevant for each type of sensitive data, a hashing function, and sensitive data formats. For example, an organization may be aware of the sensitive data and be responsible for the maintenance, deployment and configuration of the monitor 110. In some examples, the organization may configure the monitor similarly for all its customers though not identically because the sensitive information may be different for different users. The configuration tool 108 may also be used to provide text classifiers. The trusted servers 102 may generate an object containing a hashed version of the sensitive data. For example, the hashed sensitive data may be specific to each user. The trusted servers 102 may further generate a set of attributes corresponding to each type of sensitive data. The trusted servers 102 may also generate a set of text classifiers for each type of sensitive data. The trusted servers 102 may also generate a hashing function to be used by the monitor 110. The information generated by the trusted servers 102 is discussed at greater length with respect to the example system 200 of FIG. 2 below.

In some embodiments, the monitor 110 may be retrieved from the trusted server 102 or a website that is affiliated with the trusted server 102. For example, a user may have downloaded the monitor 110 and installed the monitor 110 onto the client device 104. In some examples, the monitor 110 may download information, at least some of which may be generated specifically for the user, from the trusted server 102 as indicated by an arrow 128. For example, the receiver 112 may receive the generated object with hashed sensitive data, the attributes related to each type of sensitive data, the text classifiers for each type of sensitive data, and the hashing function. In some examples, user-specific information may be saved on the trusted server 102. For example, the user may belong to an organization running the trusted server 102. In some examples, the user may supply the trusted server 102 with personal information as indicated by an arrow 126. For example, the user may supply usernames, account numbers, passwords, among other forms of personal information. Thus, in some examples, the present techniques may also be performed without an organization, with the user providing sensitive information and configuring the plugin. For example, the user may use a tool or a service to configure the plugin.

In some examples, after the monitor 110 may be installed and configured, the monitor 110 may begin monitoring outgoing traffic to the network 106 indicated by an arrow 130. In some examples, the monitor 110 may be a proxy. For example, the monitor 110 may monitor a user interface such as a web browser or an email application. In some examples, the outgoing traffic may be destined for a web server, an email server, or any other location. In some examples, the monitor 110 may monitor high level semantics of the user actions as well as a target uniform resource locator (URL). For example, the high level semantics may include information from the metadata and the header, and not just the payload, including input text, sending events, or post events. The classifier 114 can detect an input text or an output text.

For example, the output text may be part of the outgoing traffic destined for a target URL. The classifier 114 may then scan the input text or output text using the received text classifiers and detect one or more candidates. For example, candidates as used herein may include text segments that may include sensitive information. In some examples, the monitor 110 may also scan attachments, documents, or other files. For example, the monitor 110 may be an email application plugin. The hasher module 116 may hash each detected candidate using the received hashing function. The matcher module 118 may then compare hashed candidates against the received hashed sensitive data. For example, a lookup may be performed in a table including the received sensitive data. In some examples, if a candidate is found that matches the hashed sensitive data, then the extractor 120 may extract the attributes of the corresponding matched hashed sensitive data. For example, one or more attributes related to the specific data type of the matched hashed sensitive data may be extracted.

In some examples, once scanning has completed, then a mitigation action may be performed based on any number of factors including: the type of event, the amount of sensitive data, one or more attributes, or detecting an aggregation of data items that may not be disclosed simultaneously. For example, an interceptor 122 may intercept an output text based on any of the above factors. Thus, the interceptor 122 may prevent the output text from reaching a target web server or other destination. In some examples, a notifier 124 may generate an alert to alert a user. In some examples, the notifier 124 may generate a report including information such as the type of the data item that is being disclosed and what regulation is at risk. In some examples, the notifier 124 may generate a warning. For example, the notifier may generate a warning in response to the matcher detecting a match between hashed sensitive data having a predetermined attribute from two or more trusted servers. For example, the predetermined attribute may be a data type indicating that the sensitive data is a username or a password. In some examples, the notifier 124 can prompt for a password in response to detecting an intercepted input text or output text. The notifier 124 may then cause the interceptor 122 to allow the intercepted output text to be sent in response to detecting that the password is valid.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional trusted servers, networks, monitors, client devices, etc.).

Figure 2:
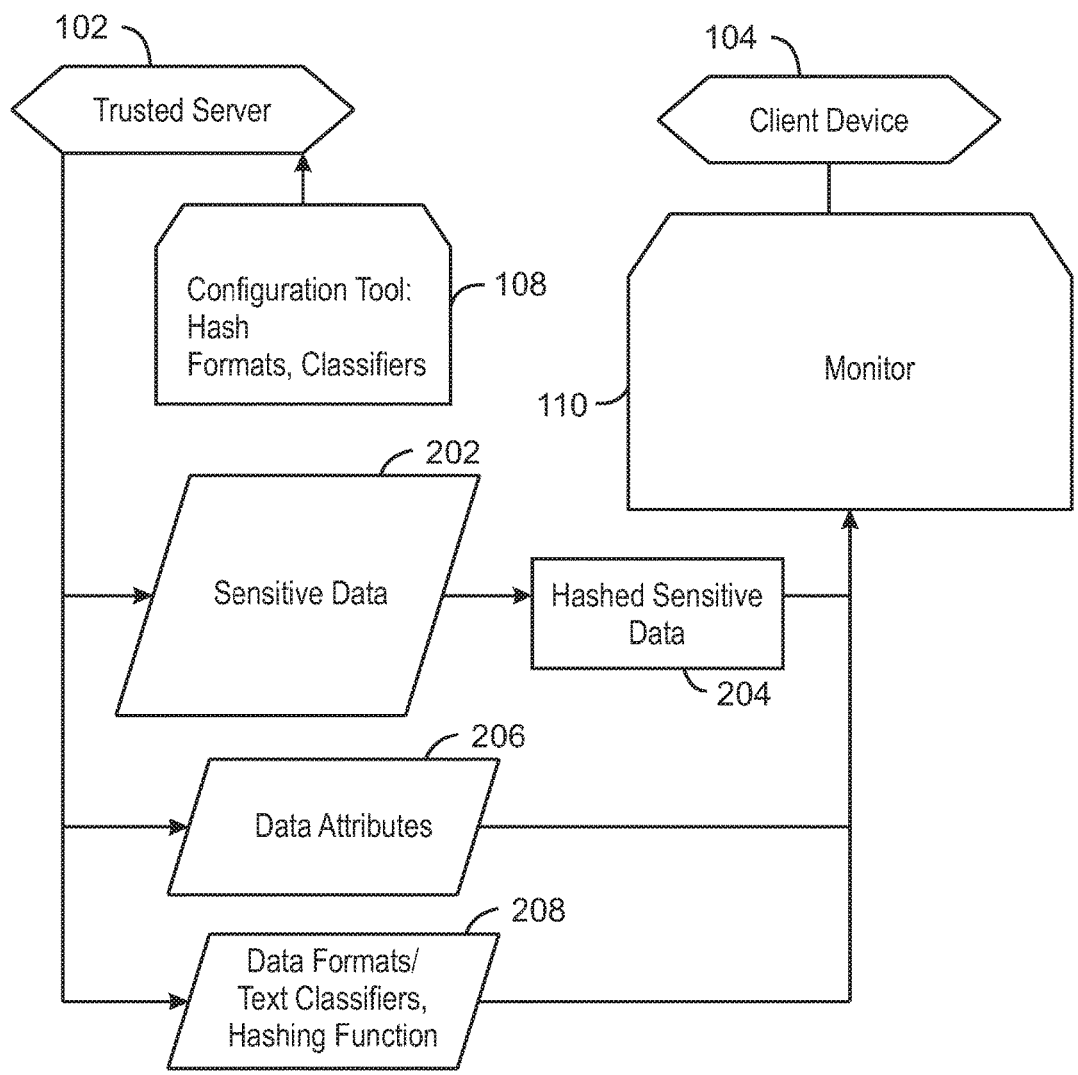
FIG. 2 is an information flow diagram of an example system that can intercept sensitive data using hashed candidates.

FIG. 2 is an information flow diagram of an example system that can intercept sensitive data using hashed candidates. The system 200 can be implemented with any suitable computing device, such as the computing device 400 of FIG. 4. For example, the client device may be the computing device 400.

As shown in FIG. 2, the trusted server 102 may receive one or more hashing functions or hash formats and text classifiers via the configuration tool 108. The organization running the trusted server 102 may then identify sensitive data 202 to be protected. For example, the sensitive data 202 may include an online user name, an account number, a user password, a credit card number, a bank account number, or IDs of account owners, among other valuable data.

The sensitive data 202 may be hashed by the trusted server 102 using a hashing function to generate hashed sensitive data 204. For example, the trusted server 102 may use a particular cryptographic hashing function such as SHA-512 or any other suitable hashing function. The hashed sensitive data 204 may then be sent to the monitor 110 of the client device 104. In some examples, the hashed sensitive data 204 may be an object that contains a hashed version of the user sensitive data. For example, the object may be specific for each user because it may contain personal information.

The trusted server 102 may also identify a set of attributes 206, or data attributes, relevant for each data in the sensitive data 202. For example, attributes 206 may include a list of trusted URLs or a sensitivity level of the sensitive data 202. In some examples, there may be different degrees of sensitive information. The attributes 206 may thus include sensitivity levels for the sensitive data 202. For example, while bank account user name and password may be very sensitive and be limited to be released to the bank for authentication during the login process, a credit card number may be sensitive but may be released in a variety of web sites for purchases. In some examples, the trusted server 102 may send a set of attributes 206 related to each type of sensitive data 202 to the monitor 110.

The trusted server 102 may also identify sensitive data formats and provide a configuration file including the data formats, text classifiers and hashing function 208 to the monitor 110. For example, the text classifiers may be code that is able to match account numbers. In some examples, text classifiers may be included for each type of sensitive data 202. In some examples, the hashing function may be code to perform hashing and any other text preparation. For example, the hashing function may include code to convert text to lower case before hashing. In some examples, the trusted server 102 may sign the configuration file before sending the configuration file to the monitor 110. The trusted server 102 may also encrypt the signature using a private key and send the encrypted signature to the monitor to use to validate the configuration file 208. In some examples, the configuration file may include the hashed sensitive data 204, data attributes 206, and data formats, text classifiers, and hashing function 208.

In some examples, a maintenance process may be performed whenever sensitive data 202 is modified. For example, sensitive data 202 may be removed, added, or changed at the trusted server 102. The trusted server 102 may thus generate an updated plugin configuration. The trusted server 102 may then reconfigure the monitor 110 by reloading the configuration. For example, the trusted server 102 may send updated hashed sensitive data 204. In some examples, an update may be performed using pull or push techniques. For example, in case of a pull technique or operation, the monitor 110 may try to identify the best times to check for updates at the trusted servers and check the trusted servers 102 periodically. In some examples, the monitor 110 may detect that a password does not match, and retrieve an updated configuration file from a trusted server 102. For example, a configuration file can be created dynamically by the trusted server 102, and then signed. If any data changes, the signature of the configuration will not match. The monitor 110 may accordingly fetch an updated configuration from the trusted server 102. In some examples, the monitor 110 may fetch the updated configuration in response to a signature mismatch, regardless of whether was a malicious change on the client side or if a simple password change was updated. In the case of a push technique or operation, the trusted server 102 can contact the monitor to send the updated configuration file.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional trusted servers, networks, monitors, client devices, etc.). The information flow diagram of FIG. 2 is not intended to indicate that the operations of the system 200 are to be executed in any particular order, or that all of the operations of the system 200 are to be included in every case. Additionally, the system 200 may perform any suitable number of additional operations.

Figure 3:
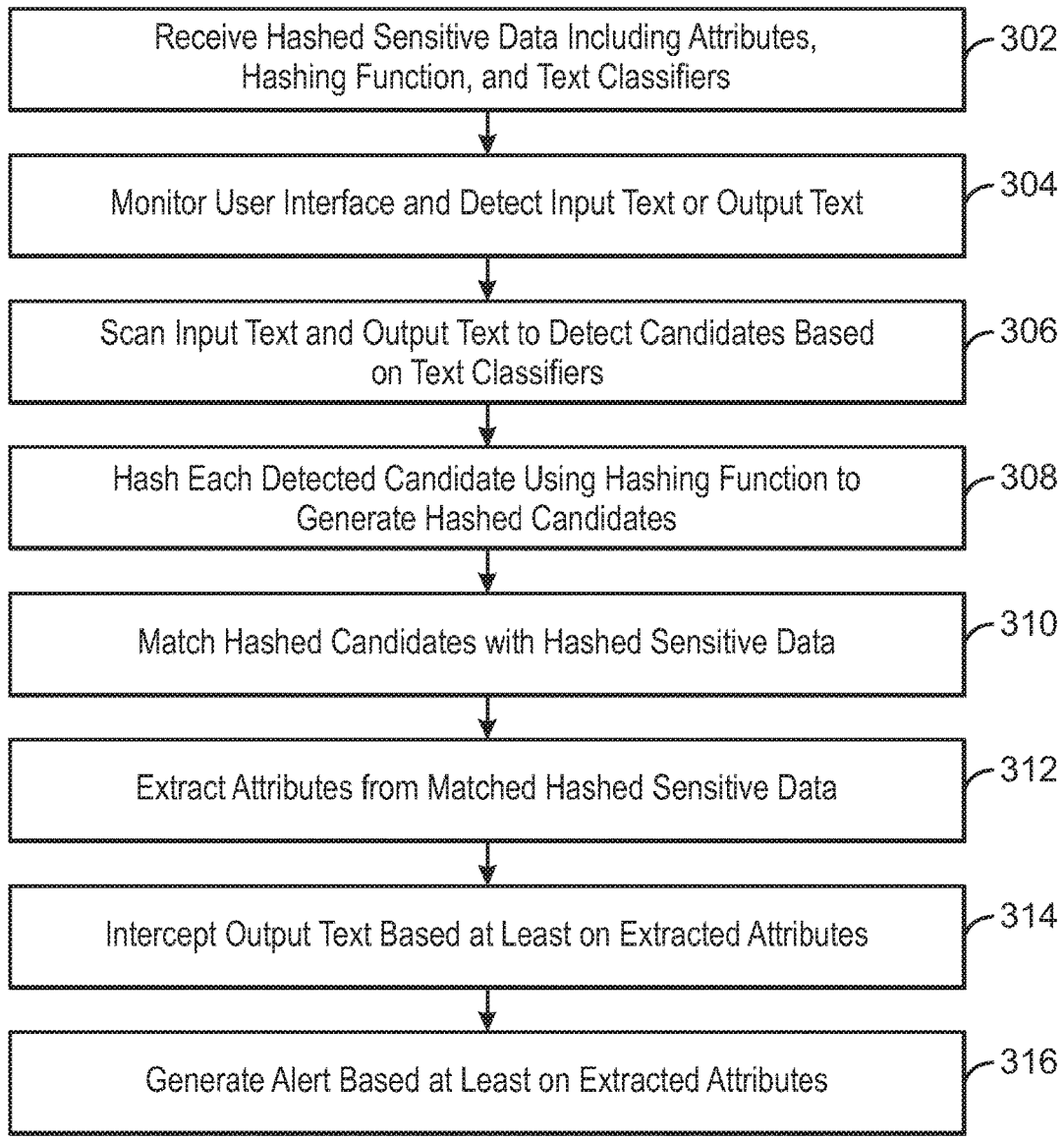
FIG. 3 is a process flow diagram of an example method that can intercept sensitive data using hashed candidates.

FIG. 3 is a process flow diagram of an example method that can intercept sensitive data using hashed candidates. The method 300 can be implemented with any suitable computing device, such as the computing device 400 of FIG. 4. For example, the method can be implemented via the processor 402 of computing device 400.

At block 302, a processor receives hashed sensitive data including attributes, hashing functions, and text classifiers. For example, attributes may include trusted URLs, sensitivity levels, for each sensitive data type. In some examples, the processor may update the received sensitive information in response to detecting that a password does not match. For example, a configuration file can be created dynamically by a trusted server and then signed and received by the processor. If any data changes, the signature of the configuration will not match. The processor may accordingly fetch the updated configuration in response to detecting the signature mismatch. In some examples, the processor may also validate a configuration file. For example, the configuration file may include the hashed sensitive data, hashing function, and text classifiers. In some examples, validating the configuration file may include receiving an encrypted signature of the configuration file and decrypting the encrypted signature using a public key, and validating content of the configuration file using the decrypted signature. For example, the encrypted signature may have been encrypted using a private key. The processor may thus prevent a malicious attacker in control of the browser from changing the configuration file and rendering it useless, and thus ensure that the configuration file has not been tampered with by a malware or the like. In some examples, the processor may validate the configuration file each time the configuration file is loaded.

At block 304, the processor monitors a user interface and detects an input text or an output text. For example, the user interface may be a web browser. The input text may be text input into a webpage. The output text may be text attempting to be sent by the webpage to a webserver. In some examples, the input text may be text that the user input into the user interface. In some examples, the output text may be text that is to be sent by the browser in response to the input text to a web server or other destination. In some examples, the monitoring may be an ongoing, repeated process that may begin whenever information is being sent to a web server or other destination. For example, the processor may begin monitoring when an input is provided to a web page, as well as when pages or forms are posted or submitted. In some examples, the processor may monitor both input text and output text to make sure that the web page does not modify the sensitive data before the monitor is able to scan it for candidates as described below.

At block 306, the processor scans an input text and an output text to detect a candidate based on the text classifiers. For example, an input text may contain a client ID that is confidential information. A text classifier in this case may be a simple dictionary. For example, the output text may contain credit card information. In some examples, the text classifier may contain a regular expression to detect a potential credit card, along with a checker to validate the control digit.

At block 308, the processor hashes the detected candidate using the hashing function to generate a hashed candidate. For example, the detected candidate may be hashed using SHA-512 or any other suitable hashing technique.

At block 310, the processor matches the hashed candidate with the hashed sensitive data. For example, a lookup may be performed in a table containing the hashed sensitive data.

At block 312, the processor extracts attributes from the matched hashed sensitive data. For example, the attributes related to the specific data type of each hashed sensitive data may be extracted. In some examples, the attribute may be a list of trusted URLs that may be allowed to receive the sensitive data.

At block 314, the processor intercepts the output text based at least on the extracted attributes. For example, the output text may be prevented from being sent to a webserver or other destination. In some examples, the processor may intercept the output based on a type of event, an amount of sensitive data, an aggregation of data items including the detected candidate that is not to be sent simultaneously, or any combination thereof.

At block 316, the processor generates an alert based at least on the extracted attributes. For example, the alert may be sent to a user to alert the user that sensitive data was attempted to be sent out. In some examples, the alert may be sent to an organization affiliated with the user. In some examples, the processor may generate a report based at least on the extracted attribute. In some examples, the processor may generate the alert or the report based on a type of event, an amount of sensitive data, an aggregation of data items including the detected candidate that is not to be sent simultaneously. In some examples, the processor may generate a warning in response to detecting that matched sensitive data with a predetermined attribute was received from two or more trusted servers. For example, the processor may receive the hashed sensitive data from a plurality of trusted servers and generate the warning in response to detecting matching hashed sensitive data comprising a predetermined attribute from two or more of the trusted servers.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method may also include prompting for a password in response to intercepting the output text and sending the output text in response to detecting a valid password. For example, the password may be used as a form of parental control or supervision of outgoing data. In some examples, the password can be used as an override mechanism.

Figure 4:
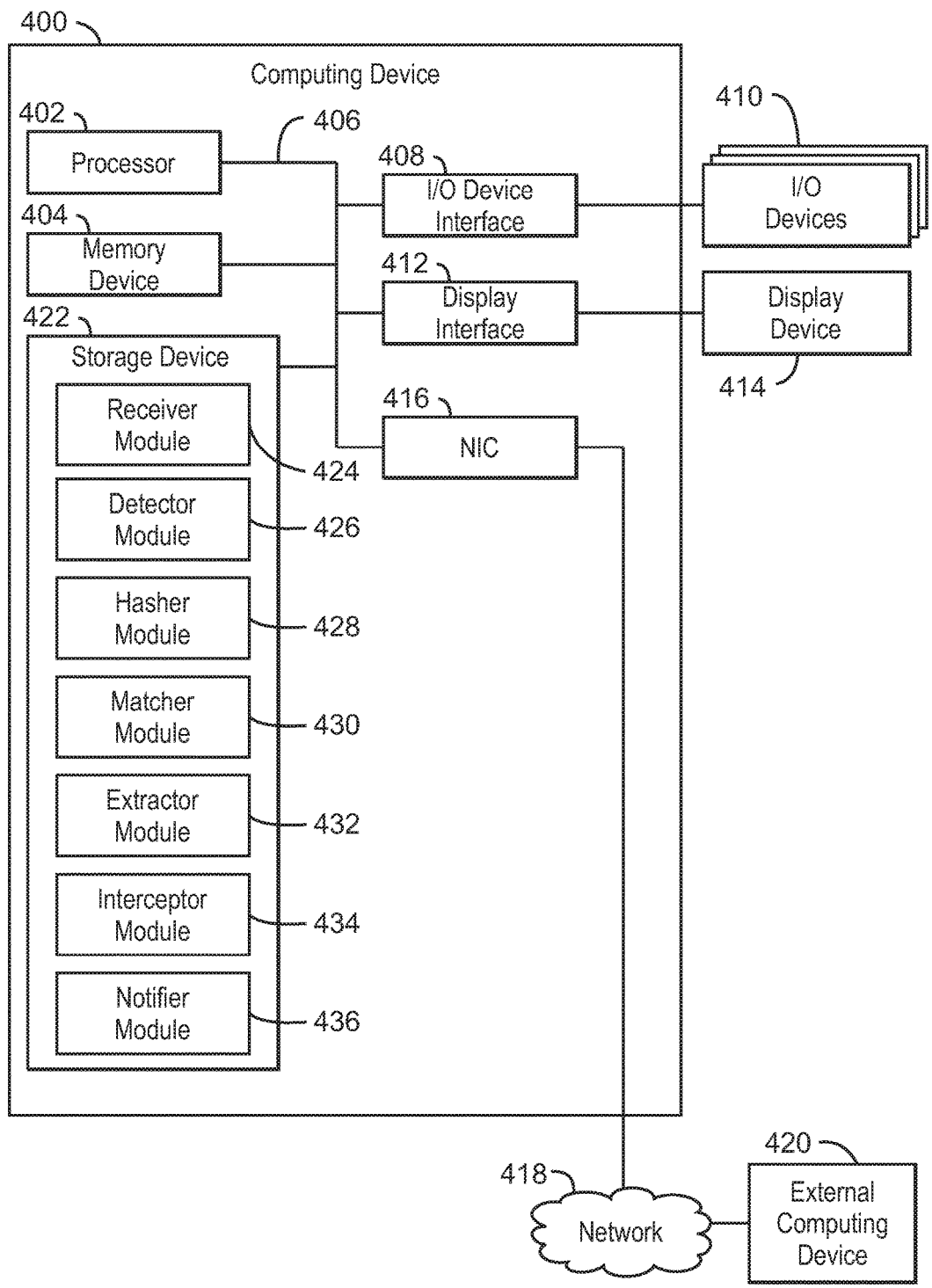
FIG. 4 is a block diagram of an example computing device that can intercept sensitive data using hashed candidates.

With reference now to FIG. 4, an example computing device can intercept sensitive data using hashed candidates. The computing device 400 may be for example, a server, a network device, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, a detector module 426, a hasher module 428, a matcher module 430, an extractor module 432, an interceptor module 434, and a notifier module 436. In some examples, one or more of the modules 424-436 may be implemented in an application or a web browser plugin. The receiver module 424 can receive hashed sensitive data, a hashing function, and text classifiers. The hashed sensitive data may include attributes. For example, the attributes may include trusted uniform resource locators, sensitivity levels, among other information. The detector module 426 can then monitor a user interface and detect an input text or an output text. The detector module 426 can also scan the detected input text or the detected output text to detect a candidate based on the text classifiers. The hasher module 428 can hash the detected candidate using the hashing function to generate a hashed candidate. The matcher module 430 can match the hashed candidate with hashed sensitive data. The extractor module 432 can extract an attribute from the matched hashed sensitive data. In some examples, the matcher module 430 can also detect that an extracted attribute of the matched hashed sensitive data includes a trusted uniform resource locator that does not match a destination address of the output text. The interceptor module 434 can intercept the output text based at least on the extracted attribute. In some examples, the interceptor module 434 can intercept the output text based on a type of event, an amount of sensitive data, an aggregation of data items including the detected candidate that is not to be sent simultaneously, or any combination thereof. In some examples, the interceptor module 434 can intercept the output text in response to detecting that the sensitivity level for the matched hashed sensitivity data exceeds a threshold level. In some examples, the notifier module 436 can generate an alert or report based at least on the extracted attribute. In some examples, the notifier module 436 may generate the alert or report additionally based on a type of event, an amount of sensitive data, an aggregation of data items including the detected candidate that is not to be sent simultaneously, or any combination thereof.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the receiver module 424, the detector module 426, the hasher module 428, the matcher module 430, the extractor module 432, the interceptor module 434, and the notifier module 436, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, the detector module 426, the hasher module 428, the matcher module 430, the extractor module 432, the interceptor module 434, and the notifier module 436, can be implemented with logic, wherein the logic, as referred to herein, can include any suitable hardware (e.g., a processor, among others), software (e.g., an application, among others), firmware, or any suitable combination of hardware, software, and firmware.

Figure 5:
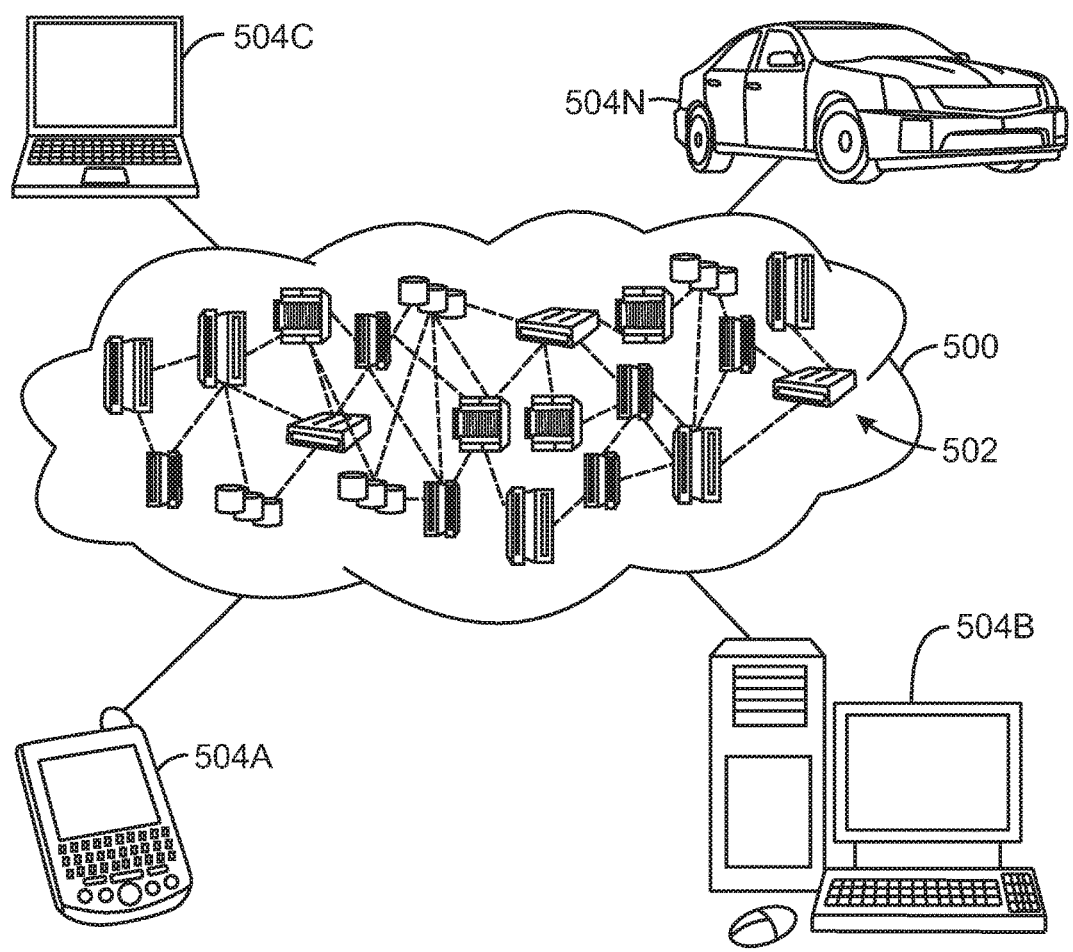
FIG. 5 is a block diagram of an example cloud computing environment according to embodiments described herein.

Referring now to FIG. 5, an illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
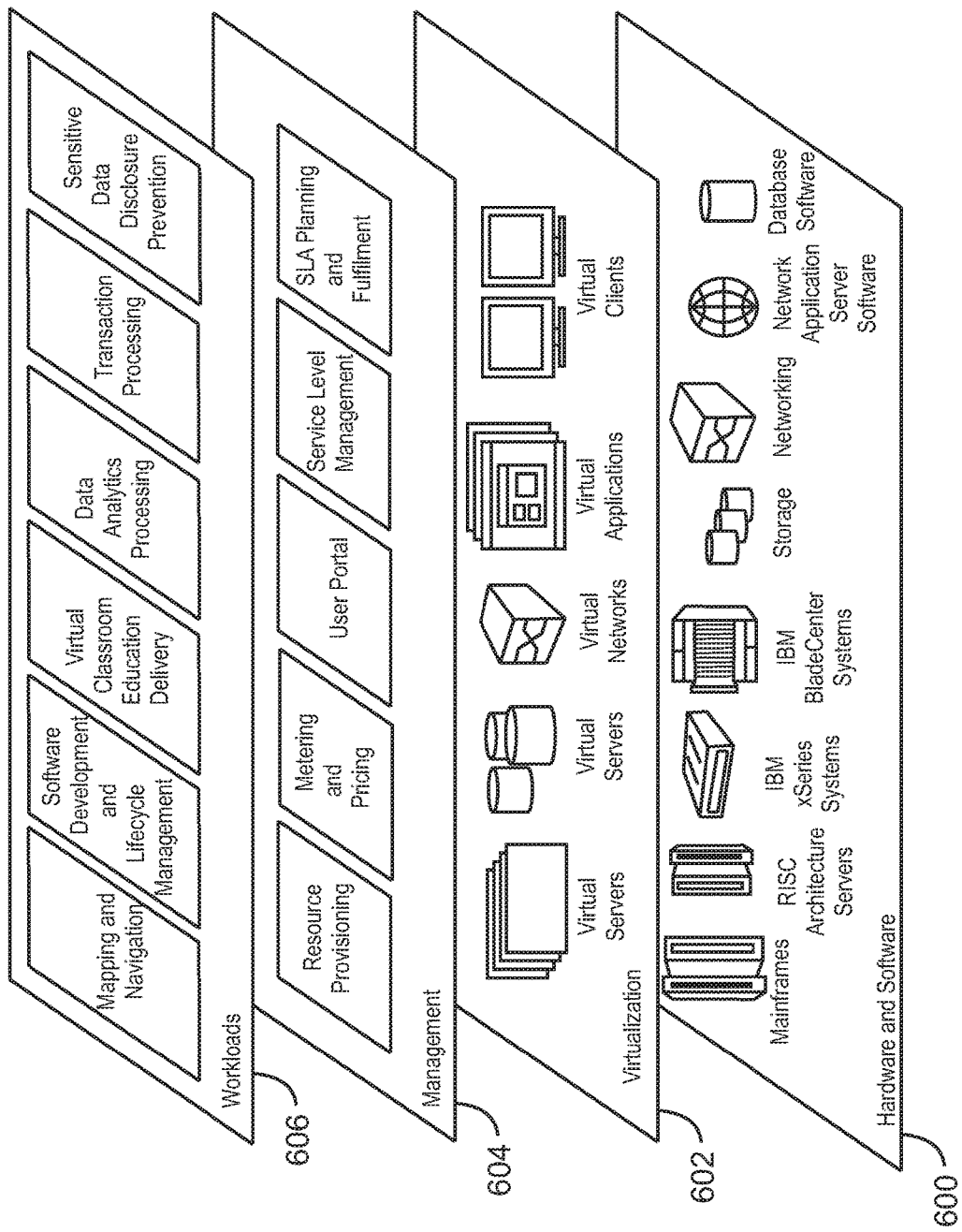
FIG. 6 is an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and sensitive data disclosure prevention.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
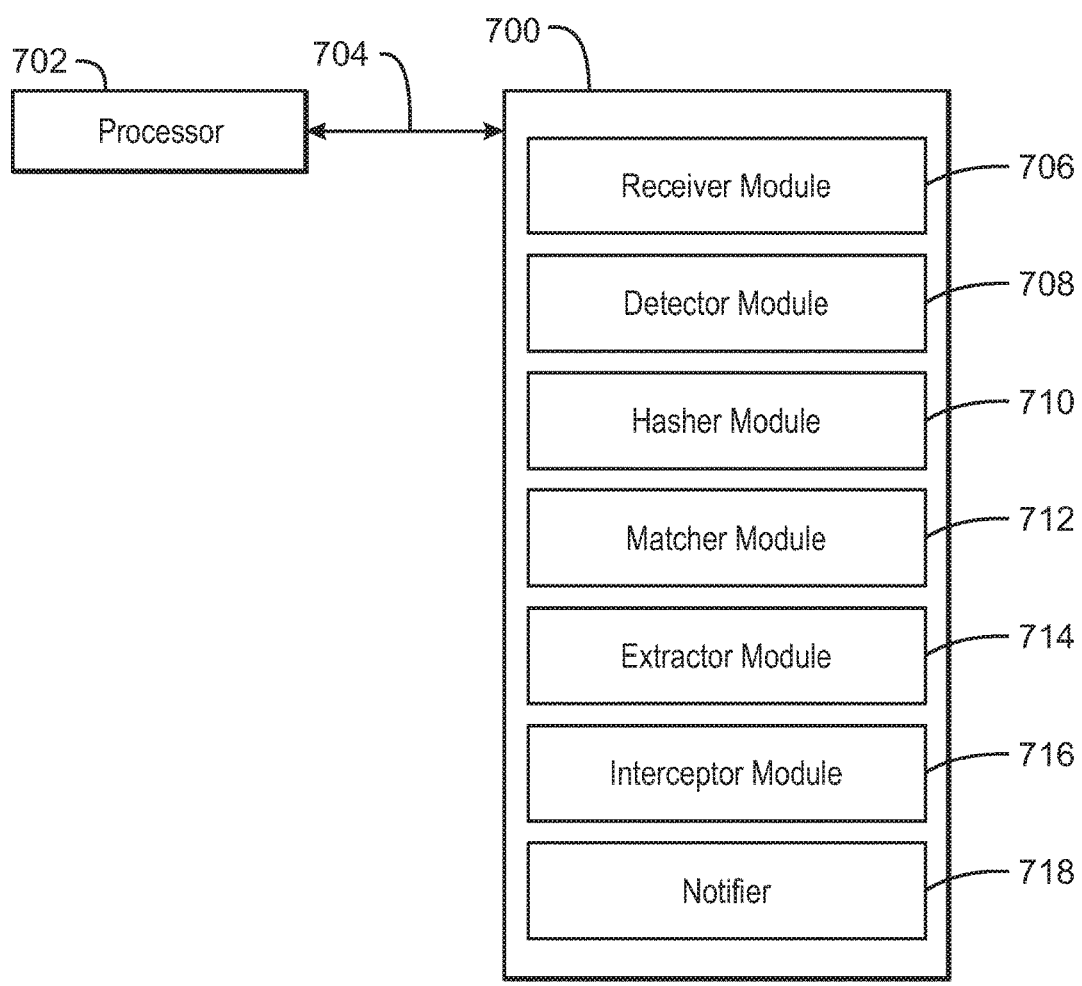
FIG. 7 is an example tangible, non-transitory computer-readable medium that can intercept sensitive data using hashed candidates.

Referring now to FIG. 7, a block diagram is depicted of an example tangible, non-transitory computer-readable medium 700 that can intercept sensitive data using hashed candidates. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3 above.

The various software components discussed herein may be stored on the tangible, non-transitory, computer-readable medium 700, as indicated in FIG. 7. For example, a receiver module 706 includes code to receive hashed sensitive data, a hashing function, and text classifiers, wherein the hashed sensitive data comprises an attribute. In some examples, the receiver module 706 may also include code to receive an encrypted signature of a configuration file. The receiver module 706 may also include code to decrypt the encrypted signature using a public key. The receiver module 706 may also include code to validate content of the configuration file using the decrypted signature. In some examples, the receiver module 706 may include code to update the received sensitive information in response to detecting that a password does not match. A detector module 708 includes code to monitor a user interface and detect an input text or an output text. For example, the user interface may be a web browser, an email application, or any other user interface with a network. The detector module 708 also includes code to scan the detected input text or the detected output text to detect a candidate based on the text classifiers. A hasher module 710 includes code to hash the detected candidate using the hashing function to generate a hashed candidate. A matcher module 712 includes code to match the hashed candidate with hashed sensitive data. An extractor module 714 includes code to extract the attribute from the matched hashed sensitive data. An interceptor module 716 includes code to intercept the output text based at least on the extracted attribute. In some examples, the interceptor module 716 can include code to intercept the output text additionally based on a type of event, an amount of sensitive data, an aggregation of data items including the detected candidate that is not to be sent simultaneously, or any combination thereof. A notifier module 718 includes code to generate an alert or report based at least on the extracted attribute. In some examples, the notifier module 718 can include code to generate a warning in response to detecting matching hashed sensitive data comprising a predetermined attribute from two or more trusted servers. In some examples, the notifier module 718 can include code to prompt for a password and sending the output text in response to detecting a valid password. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a hardware processor to:
   receive hashed sensitive data, a hashing function, and text classifiers, wherein the hashed sensitive data comprises a plurality of attributes;
   monitor a user interface and detect an input text or an output text;
   scan the detected input text or the detected output text to detect a candidate based on the text classifiers;
   hash the detected candidate using the hashing function to generate a hashed candidate;
   match the hashed candidate with the received hashed sensitive data;
   extract at least one of the plurality of attributes from the matched hashed sensitive data, wherein the at least one extracted attribute comprises a sensitivity level for the matched hashed sensitive data; and
   intercept the output text based at least on the extracted attribute in response to detecting that the sensitivity level for the matched hashed sensitivity data exceeds a threshold level.

2. The system of claim 1, wherein the processor is to generate an alert or a report based at least on the extracted attribute.

3. The system of claim 1, wherein the system comprises a browser plugin to receive the hashed sensitive data, monitor the user interface, and scan the detected input text or the detected output text.

4. The system of claim 1, wherein the attribute comprises a trusted uniform resource locator that does not match a destination address of the output text.

5. The system of claim 1, wherein the output text is intercepted based on a type of an event, an amount of sensitive data, an aggregation of data items comprising the detected candidate that is not to be sent simultaneously, or any combination thereof.

6. The system of claim 1, wherein the system comprises a network device comprising the processor or an application to be executed by the processor.

7. A computer-implemented method, comprising:
   receiving, via a processor, hashed sensitive data comprising attributes, a hashing function, and text classifiers;
   monitoring, via the processor, a user interface and detect an input text or an output text;
   scanning, via the processor, the detected input text or the detected output text to identify a candidate based on the text classifiers;
   hashing, via the processor, the detected candidate using the hashing function to generate a hashed candidate;
   matching, via the processor, the hashed candidate with the received hashed sensitive data;
   extracting, via the processor, an attribute from the matched hashed sensitive data, wherein the at least one extracted attribute comprises a sensitivity level for the matched hashed sensitive data; and
   intercepting, via the processor, the output text based at least on the extracted attribute in response to detecting that the sensitivity level for the matched hashed sensitivity data exceeds a threshold level.

8. The computer-implemented method of claim 7, comprising generating, via the processor, an alert based at least on the extracted attribute.

9. The computer-implemented method of claim 7, comprising generating, via the processor, a report based at least on the extracted attribute.

10. The computer-implemented method of claim 7, comprising receiving the hashed sensitive data from a plurality of trusted servers and generating, via the processor, a warning in response to detecting matching hashed sensitive data comprising a predetermined attribute from two or more of the trusted servers.

11. The computer-implemented method of claim 7, comprising validating a configuration file, wherein validating the configuration file comprises:
    receiving an encrypted signature of the configuration file;
    decrypting the encrypted signature using a public key; and
    validating content of the configuration file using the decrypted signature.

12. The computer-implemented method of claim 7, comprising updating the received sensitive information in response to detecting that a password does not match.

13. The computer-implemented method of claim 7, comprising prompting for a password in response to intercepting the output text and sending the output text in response to detecting a valid password.

14. A computer program product for intercepting output text, the computer program product tangibly embodied in a non-transitory computer-readable storage medium having program code embodied therewith, the program code executable by a processor to cause the processor to:

receive hashed sensitive data, a hashing function, and text classifiers, wherein the hashed sensitive data comprises an attribute;

monitor a user interface and detect an input text or an output text;

scan the detected input text or the detected output text to detect a candidate based on the text classifiers;

hash the detected candidate using the hashing function to generate a hashed candidate;

match the hashed candidate with the received hashed sensitive data;

extract the attribute from the matched hashed sensitive data, wherein the extracted attribute comprises a sensitivity level for the matched hashed sensitive data;

intercept the output text based at least on the extracted attribute in response to detecting that the sensitivity level for the matched hashed sensitivity data exceeds a threshold level; and generate an alert or report based at least on the extracted attribute.

15. The computer program product of claim 14, comprising program code executable by the processor to intercept the output text additionally based on a type of event, an amount of sensitive data, an aggregation of data items including the detected candidate that is not to be sent simultaneously, or any combination thereof.

16. The computer program product of claim 14, comprising program code executable by the processor to generate a warning in response to detecting matching hashed sensitive data comprising a predetermined attribute from two or more trusted servers.

17. The computer program product of claim 14, comprising program code executable by the processor to:

receive an encrypted signature of a configuration file;

decrypt the encrypted signature using a public key; and validate content of the configuration file using the decrypted signature.

18. The computer program product of claim 14, comprising program code executable by the processor to update the received sensitive information in response to detecting that a password does not match.

19. The computer program product of claim 14, comprising program code executable by the processor to prompt for a password and sending the output text in response to detecting a valid password.

\* \* \* \* \*